INVENTORS
CHARLES G. PARSONS
ROLAND J. HORVATH

ATTORNEY

INVENTORS
CHARLES G. PARSONS
ROLAND J. HORVATH

ATTORNEY

3,595,786
APPARATUS FOR TREATING FLUIDS
Roland J. Horvath, South Euclid, and Charles G. Parsons, Mentor, Ohio, assignors to Diamond Shamrock Corporation, Cleveland, Ohio
Continuation-in-part of abandoned application Ser. No. 748,840, July 30, 1968. This application Apr. 27, 1970, Ser. No. 32,099
Int. Cl. B01d 57/00
U.S. Cl. 210—198         12 Claims

ABSTRACT OF THE DISCLOSURE

Apparatus for treating fluids has a container with an inlet and an outlet for receiving a fluid. Where necessary, a baffle means in the container is used to form a stilling zone to reduce the kinetic energy of the fluid entering the container. In a contact zone in the container at least one holding means for a treating agent is positioned in contact with the fluid for the purpose of treating the fluid with the agent. The amount of agent exposed to contact with the fluid is adjustable by changing the position of the holding means. The holding means is rechargeable from without the container and a baffle means with an adjustable weir opening (which could be the outlet to the container) is disposed after the contact zone to regulate the amount of fluid in the container capable of contacting the agent. The apparatus can be used in treating the effluent from waste water treatment plants.

CROSS REFERENCE TO RELATED APPLICATIONS

This is a continuation-in-part application of our co-pending application, Ser. No. 748,840, Horvath and Parsons, filed July 30, 1968, now abandoned.

BACKGROUND OF THE INVENTION

(1) Field of the invention

This invention relates to apparatus for treating fluids with treating agents and to methods for treating fluids with a treating agent. In greater detail, this invention concerns a method and related apparatus for treating a fluid whereby an agent is dispensed into a source of aqueous fluid, the amount of agent being dispensed depending upon the flow rate of the fluid and the solubility of the agent in the aqueous fluid. The apparatus is particularly useful for treating sewage water effluent so as to disinfect the water and can be used to treat potable water supplies, industrial waste waters, runoff water, swimming pool waters, cooling tower waters and the like.

(2) Description of the prior art

It is known that improperly treated fluids such as sewage can transmit various diseases harmful to humans and animals. Though sewage treatment reduces the number of pathogens causing diseases, sewage treatment does not necessarily eliminate this hazard of disease. It has been shown that the chlorination, in accordance with good practice, of a treated sewage effluent will provide protection against water-borne diseases. Disinfection of the effluent from sewage treatment plants is currently accomplished by one of the following methods: by the addition of a chlorine-containing solution prepared by dissolving a chlorine-containing chemical in water to form an aqueous solution of the chemical and pumping the solution to the point at which the effluent from the plant enters the contact zone, or by dispensing a gaseous chlorine medium into the effluent from the sewage plant. However, these chlorine treatment systems, which are commonly used for effluent disinfection, have been found to require extensive, conscientious, daily attention by a reliable operator in order to achieve acceptable disinfection of sewage plant effluent. It should be stressed that these systems really are not reliable—pumps or dispensing means foul regularly, the solution systems require a source of power and fresh water and the rate of chlorine feed must be adjusted manually many times during the day as peak demands are reached during the daily cycle. Compressed gaseous chlorine is considered hazardous, requires a trained operator for its use and requires manual adjustment of the feed rate during flow variations in the plant unless large, cumbersome and expensive control modules are employed.

Numerous systems have been proposed for treating fluids with chemicals. A system for disinfecting fluids is described in U.S. Pat. 1,211,481, Noble, issued Jan. 9, 1917. In this system, the polluted fluid is received in a tank and passed through perforated receptacles containing calcium hypochlorite and carbonate of lime. The fluid flows in the tank through and around the perforated receptacles containing the chemical treating agent in such a manner that matters suspended in the liquid is deposited in the tank. This system operates at a constant level and does not provide adjustable means for regulating the amount of treating agent dispersed in the fluid.

From the foregoing discussion and the following description, it will appear that the apparatus of the present invention has many advantages over the practice in the prior art; namely, the present system is reliable in that it receives directly the effluent water from sewage treatment plants for treatment, has no pumps which require maintenance or which can fail from clogging, requires no power supply or source of fresh water, and the rate of chlorine feed need not be adjusted manually but automatically varies as the variations occur in supply of the source of effluent water from the sewage treatment plant. In addition, it is to be emphasized that the present system offers a very great advantage in that manpower is not needed in order to insure operation of the system or adjustment of the chlorine feed with variations in the effluent water flow rates. Further, the instant invention allows for continuous, long term treatment of the fluid source compared to that possible with equipment currently in use. In addition, an attendant is not needed to regulate the feeding of the chlorine-containing material. The apparatus of this invention insures proper treatment of fluids that are free of manual maintenance and of the need for constant regulation.

SUMMARY OF THE INVENTION

In light of the foregoing, it is the principal object of this invention to provide an apparatus which will enable reliable, automatic treatment of fluids free of manual maintenance with regard to the dependability of the treatment. Another object of this invention is an apparatus for disinfecting the aqueous effluent from sewage treatment plants without requiring human attention in order to have a reliable system. It is a further object of the present invention to enable the treatment of aqueous effluent from sewage treatment plants with a chemical providing a disinfecting source of chlorine. Another object of this invention is an apparatus for chlorinating aqueous systems without the necessity of using pumping devices, power sources and a supply of fresh water, all of which introduce reliability factors into the operation of the system. An additional object of this invention is an apparatus for treating the aqeous effluent from sewage treatment plants which does not require manual attention as the flow rate of aqueous effluent varies. Still further objects and advantages of this invention will be gained from the following specification, the appended claims and by reference to the drawings wherein:

DESCRIPTION OF THE PREFERRED EMBODIMENTS

In accordance with the apparatus of our invention, a treating agent is used to treat fluids in a manner such that the agent is dispensed into the fluid in a predetermined, uniform concentration independent of the flow rate of the fluid without having to use mechanical mixers, pumping devices, expensive instrumentation, power sources or solutions of the agent.

The foregoing is achieved by the method of employing this invention which consists of treating a fluid source by establishing a treatment zone for the fluid source and contacting the fluid source in the treatment zone with the agent for a period of time to dissolve the desired amounts of the agent in the fluid. In greater detail, the method of treating fluids, by use of this invention, involves introducing the fluid into a treatment zone wherein the treatment zone has at least two distinct regions, with one region being a contact region wherein the treating agent is contacted with the fluid and the other region being a regulation region whereby baffle means with a least one adjustable weir opening regulates the amount of the fluid in the container at any point in time capable of contacting the treating agent.

When the fluid is water and enters the treatment zone at high velocities or with irregular variations in velocity, it is desirable to still the fluid to reduce its velocity. The stilling region is located in advance of the contact region so that the stilling region will insure reduction of the velocity of the incoming fluid to reasonable velocities which will not unduly erode any treating agents in the contact region. The fluid contacts the treating agent in the contacting region, with the agent being dissolved in the fluid source to eventually treat the fluid through the desired action. Residence time of fluid within the contact region is controlled by the regulation region which consists of baffle means with at least one weir opening disposed before the outlet of the treatment zone. The weir opening can also form the outlet of the treatment zone so that the size of the outlet would be adjustable. The weir opening, designed to meet the specific requirements of the treating step, acts to increase the fluid level in the treatment zones as the fluid influent rate increases, thus, allowing increased contact with the treating agent. A reduced rate of fluid flow lowers the fluid level in the contacting zone, which reduces the amount of agent exposed to the fluid, and thereby reduces the amount of agent dissolved in the fluid. Therefore, as the fluid flow rate varies, the amount of treating agent exposed to the fluid varies, resulting in a predetermined, uniform concentration of agent in the fluid despite variations in the rate of fluid flow.

In a preferred mode of operation for treating aqueous fluid, the process involves introduction of fluid into the treatment zone through an inlet leading to the treatment zone. Where necessary, the treatment zone has a stilling region to regulate the fluid within proper flow rates, which prevents undue erosion downstream of the treating agent due to high velocities of the incoming fluid. The aqueous fluid flows through the stilling region into the contact region where it is exposed to the treating agent in proportion to the flow rate of the aqueous fluid. In the contact region, a predetermined amount of treating agent is introduced into the fluid. The regulating region restrains the fluid within the contact region through baffle means which will allow only a limited flow of fluid through at least one weir opening. The fluid then passes through the outlet of the treatment zone.

The apparatus of this invention comprises a container suitably disposed for receiving a fluid, means for introducing the fluid into the container (inlet), discharge means (outlet) for the fluid positioned remote from said means for introducing the fluid, at least one holding means for a source of treating agent capable of being dissolved in the entering fluid, the holding means being located downstream from the means for introducing the fluid at a point where the velocity of the fluid has reached a more or less uniform rate. A holding means is attached to the container so that it is adjustably positioned in contact with the fluid and is accessible from without the container for recharging the treating agent. Located downstream from the holding means, which forms a contact region within the container, are baffle means with at least one adjustable weir opening (regulation region) through which the fluid passes, the regulation region insuring proper contact with the agent in the contact region. After the fluid source passes beyond the baffle means, it exits from the container through a discharge means. It can be appreciated that the foregoing container can be integrated into fluid treatment plants by piping connected with means for introducing the fluid and having discharge means suitably disposed to discharge the fluid into a settling chamber or detention tank if desired.

Figure 1:
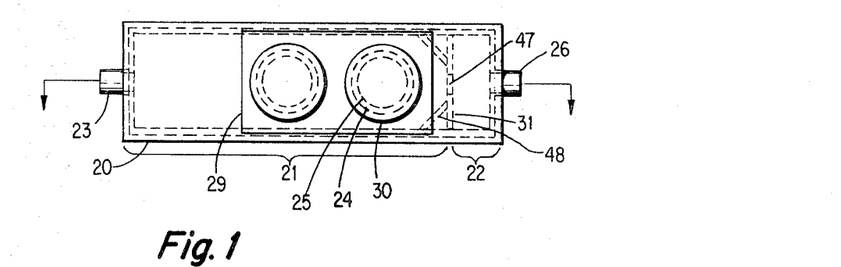
FIGS. 1 through 3 represent various views of different embodiments of the apparatus for treating fluids according to the teachings of the present invention.
Figure 2:
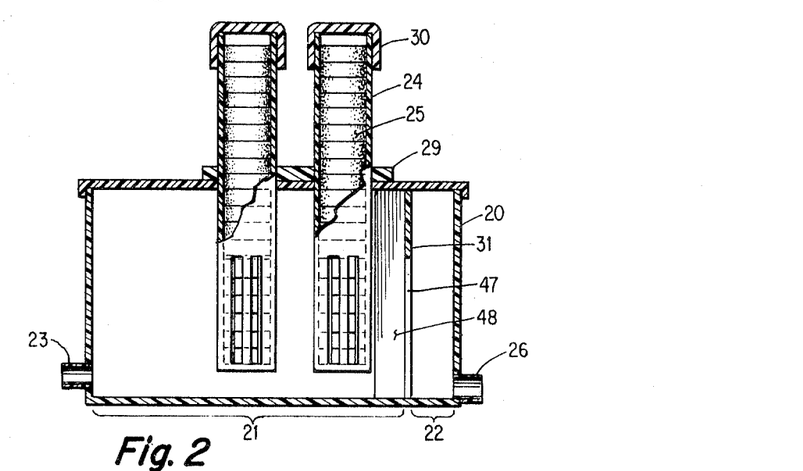

This invention will be more fully understood by reference to the drawings which prevent various embodiments of the invention. In FIGS. 1 and 2, container 20 has two regions, a contact region 21 for treating the fluid and a regulating region 22 for controlling the passage of the fluid. The fluid enters container 20 at inlet 23 and exits at outlet 26 which is positioned at the bottom of container 20 so that any suspended matter in the fluid is discharged and does not settle on the bottom of the container. Within the contact zone there is disposed at least one holding means 24 for a source of a treating agent 25. Holding means 24 is filled with the agent, preferably in tablet form 25. A portion of the holding means 24 having opening exposing the agent 25 extends in the path of the fluid so that the agent 25 is in contact with the fluid but the agent 25 is still retained within the holding means 24 until dissolved. Holding means 24 is adjustably held (e.g., mating screw threads, latch and socket) within container 20 through positioning means 29. Holding means 24 is accessible from without the container by removing cap 30.

The fluid regulating region 22 consists of baffle means 31 having at least one weir opening 47 in the baffle means 31. At least one weir opening 47 is positioned at the bottom of container 20 so that substantially all of the suspended matter in the fluid is discharged from the contact zone 21 into regulating region 22. A deflector plate 48 is positioned vertically in the contact zone on each side of the weir opening 47 at a suitable angle to deflect the fluid toward the weir opening 47 so that substantially all of the suspended matter in the fluid is discharged from contact zone 21. Weir opening 47 consists of a baffle means 31 having at least one weir opening in the baffle means. The weir opening 47 can be adjustable. See FIGS. 9 and 11. A weir opening can have an adjustable mounted plate positioned on the baffle means 31 so the size of the opening 47 can be regulated by fully opening or partly closing the opening by moving the adjustable mounted plate and thereby controlling flow of the fluid. Likewise, outlet 26 is positioned at the bottom of container 22 to assure removal of all suspended matter.

Figure 3:
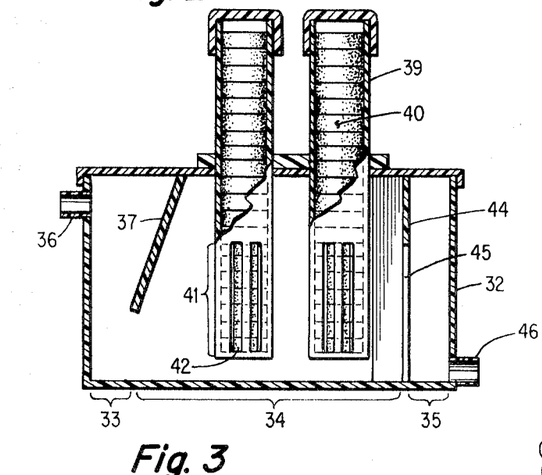

FIG. 3 represents another embodiment of the apparatus of the present invention wherein container 32 has therein three defined regions: a stilling region 33, a contact region 34 and a regulating region 35. Container 32 has an inlet 36 which can be located anywhere along the side, top or bottom of the stilling region 33. Thus, location of inlet 36 can be adapted to any manner which is convenient to receive the fluid being treated.

Within the stilling zone 33, a baffle means 37 is disposed within container 32 so as to serve as a "splash plate" and thereby reduce the velocity of the incoming fluid to prevent unnecessary erosion of the treating agent in contact zone 34. Baffle means 37 can be one or more plates extending from the top, bottom or sides of container 32. As the fluid leaves the stilling region 33, it enters contact region 34 wherein the fluid comes into contact with at least one holding means 39 containing a treating agent 40 preferably in tablet form. The agent 40 is retained by holding means 39 but comes into contact with the fluid at a portion of the holding means 41 having openings where at least one opening 42 permits contact of the fluid with the treating agent 40 and retains the agent 40 within the holding means 39 until dissolved.

The fluid flows from the contact region 34 to the regulating region 35. Regulating region 35 consists of baffle means 44 having at least one weir opening 45 in baffle means 44. At least one weir opening 45 is positioned at the bottom of container 32 so that any suspended matter in the fluid is discharged from contact region 34 and regulating region 35 and do not collect or settle on the bottom of container 32. Likewise, outlet 46 is positioned at the bottom of container 32 to assure removal of all suspended matter. Weir opening 45 has deflector plates on the upstream side in the same manner as weir opening 47 in FIGS. 1 and 2 to assure discharge of all of the suspended matter in the fluid from contact region 34. Weir opening 45 consists of a baffle means 44 having at least one weir opening in the baffle means. A weir opening can have an adjustable mounted plate positioned on the baffle means so that the size of opening can be varied from fully open to partly closed by moving the adjustable mounted plate and thereby controlling flow of the fluid source.

FIGS. 1, 2 and 3 show apparatus having two holding means for the treating agent. Apparatus having one holding means as well as those having more than two holding means are within the contemplation of the present invention. A unit having a single holding means can be used in a sewage treatment plant delivering up to 14,000 gallons of water per day for treatment depending upon the agent being used to treat the fluid and the solubility of the agent in the fluid. Likewise, an apparatus having two holding means can be used to treat 25,000 to 28,000 gallons per day under comparable conditions. Similarly, units having more than two holding means can be used to treat proportionately larger volumes of fluid.

As can be gained from the foregoing discussion, a great variation in number and arrangement can be practiced for the holding means being incorporated into the dissolving apparatus of this invention. Embodiments have been discussed and shown for two and four holding means (dispensers). But, in no sense, is this disclosure to be so limited as to the number and arrangement of dispensers that can be utilized in the apparatus of this invention. It is envisioned that multiple numbers of dispensers of the treating agent can be employed (for example, five ten or fifteen) governed only by the expected quantity of the fluid to be treated, size of container receiving the fluid, desired concentration of treating agent to be added to the fluid, solubility of the treating agent in the fluid, contamination of the fluid and degree of treatment required and/or desired, etc.

Figure 4:
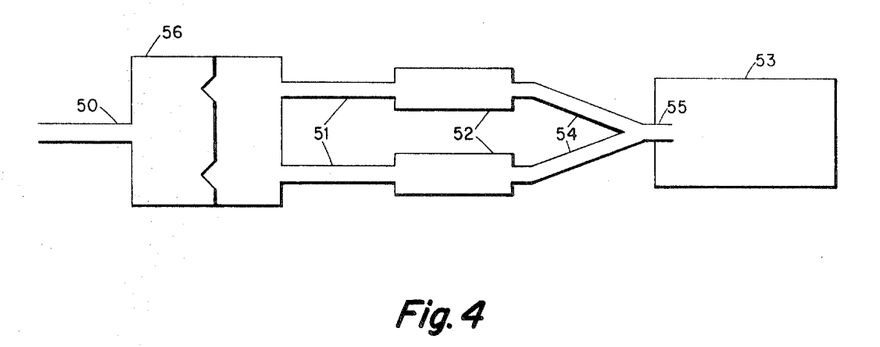
FIG. 4 represents a configuration whereby a multiple number of apparatuses of this invention can be employed in the treatment of large quantities of fluid.

FIG. 4 depicts another variation of the present invention wherein fluid inlet line 50 is divided by a flow splitter 56 into at least two branch lines 51 with each branch leading to a separate container 52 such as previously described for FIGS. 1 through 3. The fluid outlets 54 of each container 52 again merge to form a single line 55 leading to a detention chamber 53, if required. While FIG. 4 depicts a divided fluid inlet line leading to two containers 52, it is within the teachings of this invention that additional divisions of the fluid could be practiced in excess of two lines so that additional corresponding containers 52 could be employed. This would allow the system depicted here to be employed in sewage treatment plants having treatment capacities in excess of about 50,000 gallons per day. In addition, any of the foregoing embodiments of the apparatus could be utilized for the containers 52 in FIG. 4.

Figure 5:
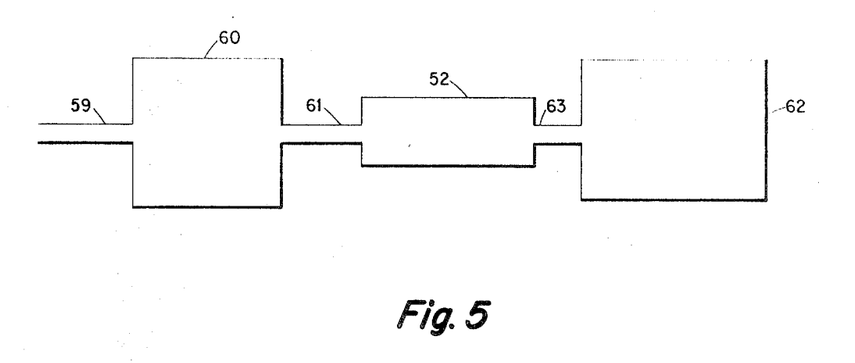
FIG. 5 represents the integration of the apparatus set forth in FIGS. 2 and 3 into the fluid flow process in a fluid treatment plant.

FIG. 5 sets forth integration of the container 52 to a fluid treatment plant effluent. The fluid treatment plant receiving fluid waste from line 59 is represented by block 60. The treated effluent from plant 60 passes through line 61 to container 52 representing an apparatus discussed for FIGS. 1 through 3 above, with the fluid effluent from container 52 passing through line 63 to a detention chamber 62. In addition, any of the foregoing embodiments of the apparatus could be utilized for the container 52 in FIG. 5. If the apparatus of the instant invention is integrated into a fluid effluent flow pattern such as in a sewage treatment plant, the apparatus will eliminate any dependence upon pumping devices normally required to deliver the treating agent into the treatment zone as previously practiced, power sources to maintain such pumping devices, fresh water supplies and the necessity of having personnel regularly feed the treating agent of the system.

Figure 6:
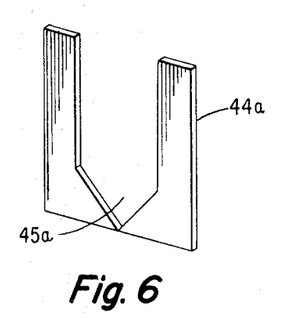
FIGS. 6 through 11 represent various types of flow controlling means (weir openings) useful in regulating fluid flow in the apparatus in the present invention.
Figure 7:
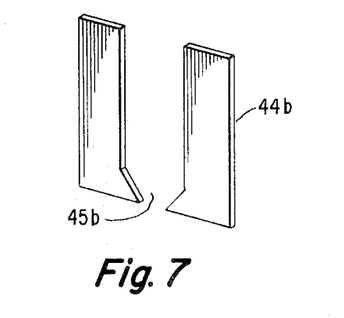
Figure 8:
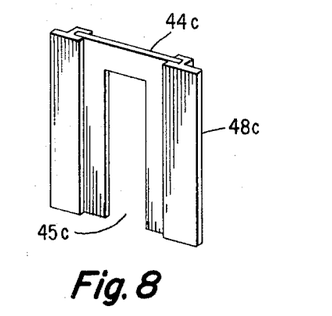
Figure 9:
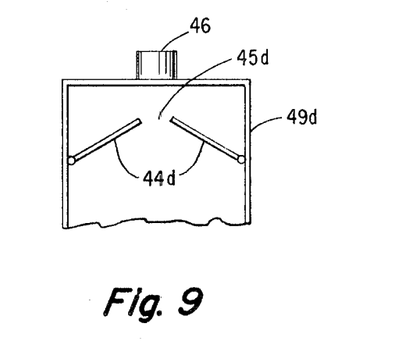
Figure 10:
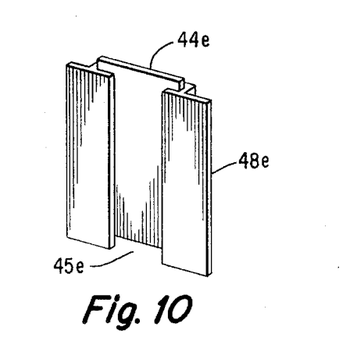
Figure 11:
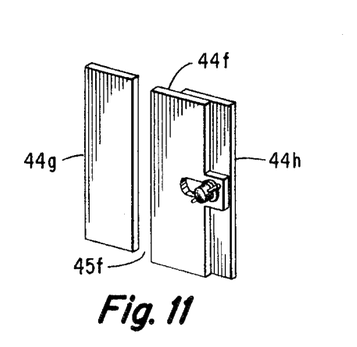

FIGS. 6 through 11 present various embodiments of baffle means having a weir opening in the baffle means. In FIG. 6, weir opening 45a is a V-notch having its apex flush with the bottom of the container in which baffle means 44a would be employed. FIG. 7 shows a weir opening 45b which is a modified V-notch wherein the apex if projected would have its terminus below the container in which baffle means 44b would be employed. In FIG. 8, weir opening 45c is in baffle means 44c having a slidable means 48c attached to the interior side walls and bottom of a container. FIG. 9 shows a top view wherein hinged baffles 44d are attached to the interior side walls of container 49d to form weir opening 45d wherein fluid exits via outlet 46. In FIG. 10, weir opening 45e is obtained by raising baffle 44e having slidable means 48e attached to the interior side walls and bottom of a container off the bottom of said container. Baffle 44e must be partly raised at all times to provide weir opening 45e. FIG. 11 shows a slidable gate arrangement wherein the width of weir opening 45f can be varied by setting adjustable baffle 44f which is attached to a fixed baffle 44h which is attached to an interior side wall and bottom of a container by moving said adjustable baffle 44f toward or away from a fixed baffle 44g which is attached to the opposite side wall and bottom of said container. It is to be understood that said weir openings are not to be limited to the foregoing figures so long as there is at least one weir opening at the bottom of the container. The above described baffles may contain a plurality of weir openings having any suitable geometric form such as circular holes, slits, triangles, squares or the like provided the openings are of sufficient size and number that they can not become plugged by suspended matter present in the fluid. It is understood that the weir opening is adequate to permit passage of the complete fluid flow for which the apparatus is designed to treat.

Figure 12:
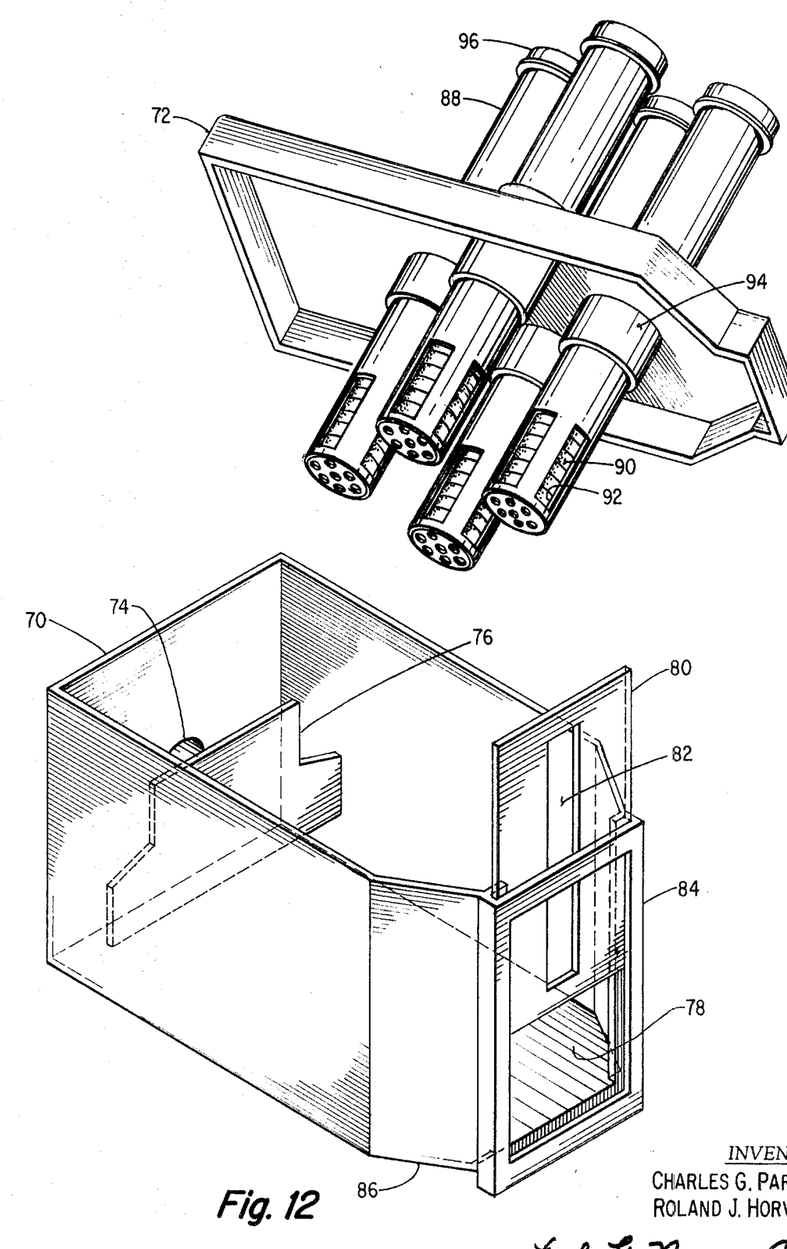
FIG. 12 represents a detailed view of an embodiment of an apparatus of this invention.

FIG. 12 presents a detailed description of an embodiment of an apparatus of the present invention. Container 70 is provided with a removable cover 72. The fluid enters container 70 through inlet 74, flows by baffle 76 which reduces the fluid velocity, enters the contact zone and exits via weir opening 82. Fluid height is regulated using removable baffle 80 which has weir opening 82. Removable baffle 80 is positioned in mounting 84 on outlet 78. The fluid height can be varied by replacing baffle 80 with one having a different size weir opening. Container 70 has a deflector plate 86 on each of the upstream sides of outlet 78 so that a suspended matter in the fluid readily flows through weir opening 82 in baffle 80 positioned in outlet 78 and does not collect in container 70.

Removable cover 72 is equipped with four holding means 88 for treating agent tablets 90. A portion of each holding means 88 has openings 92 for exposing the agent 90 to the fluid when the cover 72 is placed on container 70 and fluid is passed through the apparatus. Each holding means 88 is adjustably held within cover 72 through a positioning means 94 so that the holding means 88 is accessible from without the apparatus by removing cap 96.

Various materials can be utilized for the container and the baffle means in both the stilling region and the regulation region. These materials include cements, various metals such as cast iron, stainless steel alloys, fiberglass, plexiglass, wood, as well as various plastic materials currently available (polyvinyl chloride, acrylonitrile-butadiene-styrene, etc.). In selecting the material for the container and the baffle means, the one critical consideration is whether the material would react with the agent used to treat the fluid. The fluid inlet, fluid outlet and piping to and from the container unit are usually chosen from the same construction materials as the container itself so that electrochemical coupling effects due to dissimilar materials will not be produced.

The holding means for the treating agent can be produced from any of a variety of materials such as ceramics, the above-mentioned plastics, fiberglass, metals and alloys including steels and stainless steels. The lower end of the holding means being constructed so as to prevent the agent from falling into the container and still allow passage of the fluid through the lower end of the holding means. A wire mesh can be used on the lower end of the holding means. A very suitable material has been polyvinyl chloride plastic, one end of which can be easily cut to form a strap network for holding the treating agent while allowing maximum contact with the fluid. It is preferable at low flow volumes that one or more of the holding means be positioned on or near the bottom of the container to assure complete contact of the fluid with the agent.

Various treating agents can be employed in the practice of this invention. One of the currently preferred classes of agents for treating aqueous fluids is metallic hypochlorites, including calcium hypochlorite, lithium hypochlorite and potassium hypochlorite. Various other chlorine-generating materials have been satisfactorily employed to disinfect aqueous fluids passing through the container. Among those materials used are the halogenated cyanurates, including the zinc di(dichloroisocyanurate) and hydrates thereof such as amorphous zinc di(dichloroisocyanurate) and crystalline zinc di(dichloroisocyanurate) trihydrate, tetrahydrate and the hexahydrate; the halogenated glycolurils such as 1,3,4,6-tetrachloro- glycoluril, 1,3,4,6 - tetrachloro - 3a,6a - dimethylglycoluril, 1,3,4,6 - tetrachloro - 3a-methylglycoluril, 1,3,4,6- tetrachloro - 3a, 6a-diphenylglycoluril, 1,3,4,6 - tetrachloro-3a - methyl - 6a - phenylglycoluril, 1,3,4,6-tetrachloro-3a - ethyl - 6a - methylglycoluril, dichloroglycoluril, N,N-dibromo-N-monochloro - 3a,6a - dimethylglycoluril, N-monobromo-N-monochloro-glycoluril, N,N - dibromoglycoluril, N-monobromo-N,N-dichloro - 3a,6a - diphenylglycoluril, N,N-dibromo-N,N-dichloro - 3a,6a - dimethylglycoluril and 1,5-dimethyl - 2,4,6,8 - tetrachloro-2,4,6,8- tetrabicyclo - (3.3.1) - nona - 3,7 - dione; the halogenated hydantoins including N-bromo-N-chloro - 5,5 - dimethylhydantoin and 1,3 - dichloro - 5,5 - dimethylhydantoin; the chlorinated melamines such as trichloromelamine and hexachloromelamines; the halogenated succinimides; the chlorinated arylsulfonamides including sodium N-chloro-p-toluene-sulfonamide, N,N - dichloro-p-toluenesulfonamide and p-(N,N - dichlorosulfamyl)-benzoic acid. It is further within the practice of this invention that combinations of the foregoing treating agents may be employed. It is within the teaching of this invention that any chemical which can be compacted into solid tablets, granules, or have a powder form so as to have a controlled rate of dissolution can be employed within the holding means as a suitable treating agent within the practice of this invention. In practice, the treating agent, preferably in the form of tablets, is suspended in the contact chamber through the use of a suitable device (the holding means previously discussed). In the practice of this invention, the upper portion of the holding means forms a feed tube which is a reservoir section containing additional tablets which gradually work their way through the force of gravity to the lower or exposed active area of the tube in contact with the fluid as the tablets in the lower section are dissolved. The form in which the treating agent is utilized in the practice of this invention is determined by the physical characteristics of the agent. For example, a disinfecting agent with a relatively high solubility in water, a high density tablet measuring about three inches in diameter and weighing about 130 grams can be used. However, other various weights and sizes of tablet can be adapted to fit into the holding means within the practice of this invention. In one example, where calcium hypochlorite is used, a tablet about three inches in diameter and weighing about 130 grams is employed. With a relatively water insoluble agent such as tetra chloroglycoluril, the preferred form is small granules or tablets having dimensions no greater than ¾ inch by ½ inch, in which case a screen of fine size is used to form the lower part of the holding means for the treating agent.

In order that those skilled in the art may better understand the present invention and the preferred method by which it may be practiced, the following specific examples are offered. When the term length is used in describing the apparatus, it means the longer of the dimensions of the apparatus whereas the term width means the shorter dimension of the apparatus.

EXAMPLE 1

This example shows that the chemical dissolving unit of this invention can deliver a constant dosage independent of variations in the flow rate of the fluid entering the unit. The unit used is 15%6 inches in length (inlet to exit), 5%6 inches in width, 2⅞ inches in height, with a baffle means located three inches from the inlet and a baffle means with a rectangular weir opening (1.0 inch in width by 2⅞ inches in height) located approximately four inches before the exit. One cylindrical holding means has 3⅛ inches inside diameter, 3½ inches outside diameter by 12 inches in length, with the lower six inches having a basket retainer with a strap network conforming to the shape of the cylinder for withholding the treating agent. The holding means is charged with fresh tablets of calcium hypochlorite, $Ca(OCl)_2$, and is mounted so that the bottom tablet in the means is within 0.56 inch of the floor of the unit. Each tablet weighs 130 grams and is compacted so as to be slightly less than the dimensions of the holding means, with a diameter of 2⅝ inches and a thickness of 1%6 inch. Water is charged into the unit at varying flow rates, and the water height in the unit varies between ⅝ inch and 1⅝ inches. Table 1 gives the results of concentration of chlorine in the charged water, with each flow rate being held for a period up to two hours.

TABLE 1

| Flow rate (gallons per minute): | Average chlorine dosage delivered (parts per million parts water) |
|---|---|
| 2 | 10.3 |
| 3 | 10.8 |
| 4 | 10.0 |
| 6 | 10.0 |
| 8 | 10.5 |

The chlorine dosage in the water was determined by the iodometric titration technique described in "Standard Methods for the Examination of Water and Wastewater," Twelfth edition, 1965, American Public Health Association, Inc., pp. 90–93.

EXAMPLE 2

This experiment is designed to test the variation in delivery of the chlorine content to the charged fluid source. In the apparatus charged with calcium hypochlorite tablets as described in Example 1, with ½ inch wide opening in the baffle means near the exit and an average water depth in the unit of 2 3/16 inches, water was charged into the unit for chemical treatment for 72.5 hours of approximately 9 eight hour periods of operation at a flow rate of six gallons per minute, and the apparatus was adjusted to deliver approximately 9 parts per million of available chlorine into the fluid. The purpose of this experiment was to determine how chlorine dosage of the fluid would vary over a series of long periods.

Chlorine dosage in the water was determined by the iodometric titration technique described in "Standard Methods for the Examination of Water and Wastewater," Twelfth edition, 1965, American Public Health Association, Inc., pp. 90–93.

Results of this experiment show that chlorine dosage varied within a desirable range of 6.0 to 11.0 parts per million water during the experiment. Further, the dissolving unit delivers a chlorine dosage of 9.0±2 parts per million parts water for 94.5% of the operating time of this experiment without buildup of solids in the apparatus. Tablet surface erosion and replacement as tablets move down the tube account for variation in dosage with time.

EXAMPLE 3

Effects of vertical variation of feed tube position

A holding means (feed tube) is filled with calcium hypochlorite, $Ca(OCl)_2$, tablets 1¼ inches thick by 2⅝ inches in diameter (195 grams each) and positioned in a dissolver unit 28 inches in length (inlet to exit), 7⅝ inches in width, 14 inches in height, with a baffle means 3 inches from the inlet and a baffle means with a rectangular weir opening 1 inch in width by 14 inches in height located 4 inches before the exit. The holding means (as described in Example 1) is set in the dissolver so that the distance between the bottom of the dissolver and the bottommost tablet in the holding means is a distance which can vary with adjustment and is defined as the "underflow" in the following Table 2. The holding means is 4 inches from the weir opening in the baffle means nearest the exit and centered in regard to width of the unit. After 4 days on stream at an average flow rate of 17 gallons per minute for these 4 days, the consumption rate of the sanitizer is measured on a daily basis with the results given as follows:

TABLE 2

| Underflow in inches: | Consumption of $Ca(OCl)_2$ lbs./day (24 hours) |
|---|---|
| ½ | 1.62 |
| ¾ | 1.13 |
| 1 | 0.18 |

This table shows that the relative dosage of chlorine in the fluid can be varied as the relative contact between the chemical and the fluid is varied.

EXAMPLE 4

Effect of horizontal variation of feed tube position

A holding means (feed tube) is filled with calcium hypochlorite tablets of size and weight given in Example 1 and positioned in a dissolver unit of dimensions given in Example 3. The feed tube is set in the dissolver so that the distance between the bottom of the dissolver channel and the bottommost tablet in the tube is a constant distance of 3/16 inch for this experiment, and the horizontal distance between weir opening and the outside diameter of the tube is varied to determine the effect on consumption of the chemical.

After 4 days of operation of a dissolver unit at an average flow rate of water of 17 gallons per minute, the daily consumption rate of the chemical is measured in pounds with variation in the distance between the weir opening and the tube as follows:

TABLE 3

| Distance between weir opening and feed tube in inches: | Consumption of chemical in lbs./day |
|---|---|
| 2 | 1.05 |
| 3 | 0.76 |
| 4 | 0.46 |

As the distance from the weir is increased, the rate of delivery of the chemical to the water falls off with the dosage of chlorine in the water correspondingly falling off. Also, as the distance from the weir is decreased, the rate of delivery of the chemical to the water increases and the dosage of chlorine in the water increases. This is due to the increase in velocity of the fluid at points more nearly approaching the weir opening.

EXAMPLE 5

Multiple feeding of chemical to fluid source

Two holding means (feed tubes) of dimensions given in Example 1 are each filled with 12 tablets of calcium hypochlorite $[Ca(OCl)_2]$ of size and weight given in Example 1 so that each tube contains 1680 grams (3.70 pounds) of tablets with 76.1% available chlorine in the tablets. The tubes are placed in a dissolving unit in line with the flow direction of the fluid source through the unit. The first tube is placed in the dissolver 4 inches horizontally from the weir opening in the baffle means nearest the exit in the unit and approximately equidistant from the sides of the unit. The second tube is located 3 inches from the first tube toward the inlet (7 inches from the weir opening). The tubes are set in the dissolver so that the distance between the bottom of the dissolver and the bottommost tablet in the tube is 3/16 inch for the first tube and 1 inch for the second tube. The dimensions of the dissolving unit are an overall length of 28 inches, width of 7⅝ inches, 14 inches in height, with a baffle means 3 inches from the inlet and the baffle means located 4 inches from the exit of the unit. The weir opening is 15/16 inch wide and causes a backup of water equal to ¼ inch water height increase for each added 2 gallons per minute increment in flow rate through the dissolver.

The dissolver is connected to the effluent of a package sewage treatment plant having an output volume of 25,000 gallons of treated sewage per day. During this experiment, the flow through the dissolver ranges from 5 gallons per minute to 30 gallons per minute. The analysis of samples taken for residual available chlorine determination during periods of high and low flow show an average of 2.5 parts of chlorine per million parts of water after 20 minutes detention time. Initial populations of E. coli before chlorination ranged from $3.5 \times 10^6$ to $2.76 \times 10^4$ per 100 ml. of influent sewage. After chlorination, probability analysis of the results of bacteriological samplings showed a 50% probability of $\leq 50$ E. coli per 100 ml. remaining after 20 minutes detention time. This gives an average reduction of E. coli of 99.85% from the average initial population. Analysis for chlorine was conducted in accordance with procedures described in "Standard Methods for the Examination of Water and Wastewater," Twelfth edition, 1965, American Public Health Association, Inc., at page 375, and E. coli population was determined by the procedure at page 611 of the same reference.

This unit was operated for approximately 1 week on the initial charge of chemical achieving the above reduction of E. coli before it was desirable to recharge the unit with added chemical supply.

From the foregoing, it is apparent that the apparatus of this invention provides continuous, long term, effective, essentially maintenance-free treatment of fluid through contact with treating agents under varying conditions of volume flow for the fluid. Further, while the system was designed primarily for treating effluent aqueous fluids from sewage treatment plants, it can be effectively used to treat potable water supplies, industrial wastes, runoff water, swimming pool waters and the like. However, of particular importance is the treatment of effluent aqueous discharge of package sewage treatment plants. As can be appreciated, disinfection of the water effluent from such sewage systems serves a very beneficial and necessary function in society where close living conditions are a necessity. Also, it can be seen from the examples that the amount of treating agent can be varied while maintaining a uniform flow rate by varying the weir opening or horizontal or vertical placement of the feed tube or by varying the number of feed tubes containing treating agent.

A person familiar with the practice for sewage treatment plants will comprehend that the present invention enables more effective utilization of employee time to carry on the necessary functions of a sewage treatment plant without having to interrupt periodically these functions to charge a treating agent to a vat whereby a solution is prepared to be pumped to a location to disinfect an aqueous fluid. In addition, the present system enables achievement of a degree of reliability for attaining effective disinfection, as no longer will the appaartus have to be adjusted by human operators in order to charge the correct amount of treating agent as the flow rate of the aqueous fluid varies.

The present invention has enabled chemical treatment of sewage waters without the complication of build up of sewage solids which eventually results in plugging of the fluid flow through the treatment zone. Plugging has been a problem associated with the prior art devices, but because of the design of the current invention, this problem is alleviated.

Because of the utility and relatively simple nature of the design of the apparatuses of this invention, the invention can find adaptation in other areas of application such as dispensing low solubility fertilizers or biocides in irrigation waters or aqueous soils such as rice paddies or swamps. These applications also include dispensing flocculants, dispersants, corrosion or scale inhibitors, medicaments for animal or human health, animal food supplements and the like into fluid systems.

In the drawings and specification there have been set forth preferred embodiments of the invention and illustrative uses thereof and, although specific terms are employed, they are used in a generic and descriptive sense only and not for purposes of limitation, the scope of the invention being defined in the claims.

We claim:
1. An apparatus for treating fluid which comprises:
   (A) a container for temporarily receiving a fluid through
      (i) an inlet means for introducing the fluid in said container, and
      (ii) an outlet means for discharging the fluid from said container,
   (B) at least one holding means for a treating agent,
      (i) the holding means being adjustably disposed within the container with the agent being exposed to contact with the fluid, and
      (ii) each holding means being accessible from without the container for recharging the treating agent, and
   (C) a baffle means having at least one weir opening positioned at the bottom of the container, said baffle means being associated with the container having integral vertical deflector plates positioned on the upstream side of the weir opening so that the fluid height can be controlled by said opening and the deflector plates aid in removal of suspended matter from said apparatus.
2. The apparatus of claim 1 wherein a second baffle means is disposed between said means for introducing the fluid in said container and the holding means, thereby reducing the kinetic energy of the incoming fluid.
3. The apparatus of claim 1 wherein the treating agent is for treating an aqueous fluid and the agent is selected from the group consisting of metallic hypochlorites, the halogenated cyanurates, the halogenated glycolurils, the halogenated hydantoins, the chlorinated melamines, the halogenated succinimides, the chlorinated arylsulfonamides and combinations thereof.
4. The apparatus of claim 3 wherein the treating agent is calcium hypochlorite.
5. The apparatus of claim 1 wherein the holdinng means is cylindrical in shape and capable of receiving and holding treating agents, the holding means having a partially open portion in the form of a strap network permitting contact in said partially open portion between the agent and the fluid.
6. The apparatus according to claim 1 wherein one holding means is disposed in the container.
7. The apparatus according to claim 1 wherein two holding means are disposed in the container.
8. The apparatus according to claim 1 wherein three holding means are disposed in the container.
9. The apparatus according to claim 1 wherein four holding means are disposed in the container.
10. The apparatus according to claim 1 wherein the weir opening in the baffle means is adjustable.
11. An apparatus for treating very high flow rates of fluid which comprises:
   (A) a flow splitting means disposed within a conduit means so as to divide the flow of the fluid into at least two bodies;
   (B) a container disposed to receive each body of the fluid, each container including:
      (i) an inlet means for introducing the fluid into the container;
      (ii) an outlet means for discharging the fluid from said container; and
      (iii) at least one holding means for a treating agent, the holding means being adjustably disposed within the container with the agent being exposed to contact with the fluid and each holding means being accessible from without the container for recharging the agent;
      (iv) a baffle means having a weir opening associated with the container for regulating the height of the fluid; and

(v) vertical deflector plates positioned on the upstream side of the container for aiding in the removal of suspended matter from said apparatus.

12. The apparatus of claim 11 wherein each container has a second baffle means disposed between said means for introducing the fluid in said container and the holding means, thereby reducing the kinetic energy of the incoming fluid.

References Cited
UNITED STATES PATENTS

| | | | |
|---|---|---|---|
| 3,495,948 | 2/1970 | Long et al. | 23—272.7 |
| 1,211,481 | 1/1917 | Noble | 210—62 |

JAMES L. DeCESARE, Primary Examiner

U.S. Cl. X.R.

23—272.7